United States Patent
Braun et al.

(10) Patent No.: US 10,828,874 B2
(45) Date of Patent: Nov. 10, 2020

(54) COMPOSITE BOARD COMPOSED OF WOOD MATERIAL WITH A MIDDLE LAYER MADE OF PLYWOOD

(71) Applicant: SWISS KRONO TEC AG, Lucerne (CH)

(72) Inventors: Roger Braun, Willisau (CH); Josef Hofer, Horw (CH)

(73) Assignee: SWISS KRONO TEC AG, Lucerne (CH)

( * ) Notice: Subject to any disclaimer, the term of this patent is extended or adjusted under 35 U.S.C. 154(b) by 0 days.

(21) Appl. No.: 16/077,116

(22) PCT Filed: Jan. 18, 2017

(86) PCT No.: PCT/EP2017/050914
§ 371 (c)(1),
(2) Date: Aug. 10, 2018

(87) PCT Pub. No.: WO2017/137217
PCT Pub. Date: Aug. 17, 2017

(65) Prior Publication Data
US 2019/0047263 A1    Feb. 14, 2019

(30) Foreign Application Priority Data
Feb. 11, 2016    (EP) .................... 16155313

(51) Int. Cl.
*B32B 21/02*    (2006.01)
*B32B 21/06*    (2006.01)
(Continued)

(52) U.S. Cl.
CPC ............. *B32B 21/02* (2013.01); *B32B 21/06* (2013.01); *B32B 21/14* (2013.01); *B32B 29/02* (2013.01);
(Continued)

(58) Field of Classification Search
CPC ...................................................... B32B 21/02
(Continued)

(56) References Cited

U.S. PATENT DOCUMENTS

| | | | | |
|---|---|---|---|---|
| 5,925,211 A | * | 7/1999 | Rakauskas | ............... B27D 1/00 156/306.9 |
| 6,451,444 B1 | | 9/2002 | Ollila et al. | |
| 2005/0136276 A1 | * | 6/2005 | Borup | ..................... B32B 21/06 428/528 |

FOREIGN PATENT DOCUMENTS

| | | |
|---|---|---|
| CN | 201525061 U | 7/2010 |
| CN | 103786195 A | 5/2014 |

(Continued)

OTHER PUBLICATIONS

Pfleiderer, PremiumBoard MFP Hybrid Brochure, published Oct. 2013.
(Continued)

*Primary Examiner* — Brent T O'Hern
(74) *Attorney, Agent, or Firm* — Bachman and LaPointe PC; George Coury

(57) ABSTRACT

The invention relates to a composite board composed of wood material, comprising a middle layer composed of plywood, wherein the middle layer is connected to at least one outer layer composed of fiberboard. In order to provide an economically producible composite board having improved strength properties, an artificial resin-impregnated paper according to the invention is arranged between the middle layer and the outer layer. The invention further relates to a method for producing the composite board composed of wood material.

17 Claims, 1 Drawing Sheet

(51) Int. Cl.
  *B32B 21/14* (2006.01)
  *B32B 29/02* (2006.01)
  *B32B 29/06* (2006.01)
  *B32B 21/08* (2006.01)
  *B32B 15/10* (2006.01)
  *B32B 9/00* (2006.01)
  *B32B 5/02* (2006.01)

(52) U.S. Cl.
  CPC .............. *B32B 29/06* (2013.01); *B32B 5/024* (2013.01); *B32B 9/002* (2013.01); *B32B 9/005* (2013.01); *B32B 15/10* (2013.01); *B32B 21/08* (2013.01); *B32B 2255/08* (2013.01); *B32B 2255/26* (2013.01); *B32B 2260/028* (2013.01); *B32B 2260/046* (2013.01); *B32B 2307/3065* (2013.01); *B32B 2307/75* (2013.01)

(58) Field of Classification Search
  USPC ........................................................ 428/220
  See application file for complete search history.

(56) References Cited

FOREIGN PATENT DOCUMENTS

| | | |
|---|---|---|
| DE | 10300247 A1 | 7/2004 |
| DE | 10300247 B4 | 11/2006 |
| DE | 69931251 T1 | 4/2007 |
| DE | 69931251 T2 | 4/2007 |

OTHER PUBLICATIONS

Extended European search report for patent application No. 16 155 313.6 dated Jul. 20, 2016.
Communication under rule 71(3) EPC for patent application No. 16 155 313.6 dated Mar. 13, 2019.
International preliminary report on patentability for Apln. No. PCT/EP2017/050914 dated Aug. 14, 2018.
Chinese office action for patent application No. 201780010089.1 dated Oct. 23, 2019.

\* cited by examiner

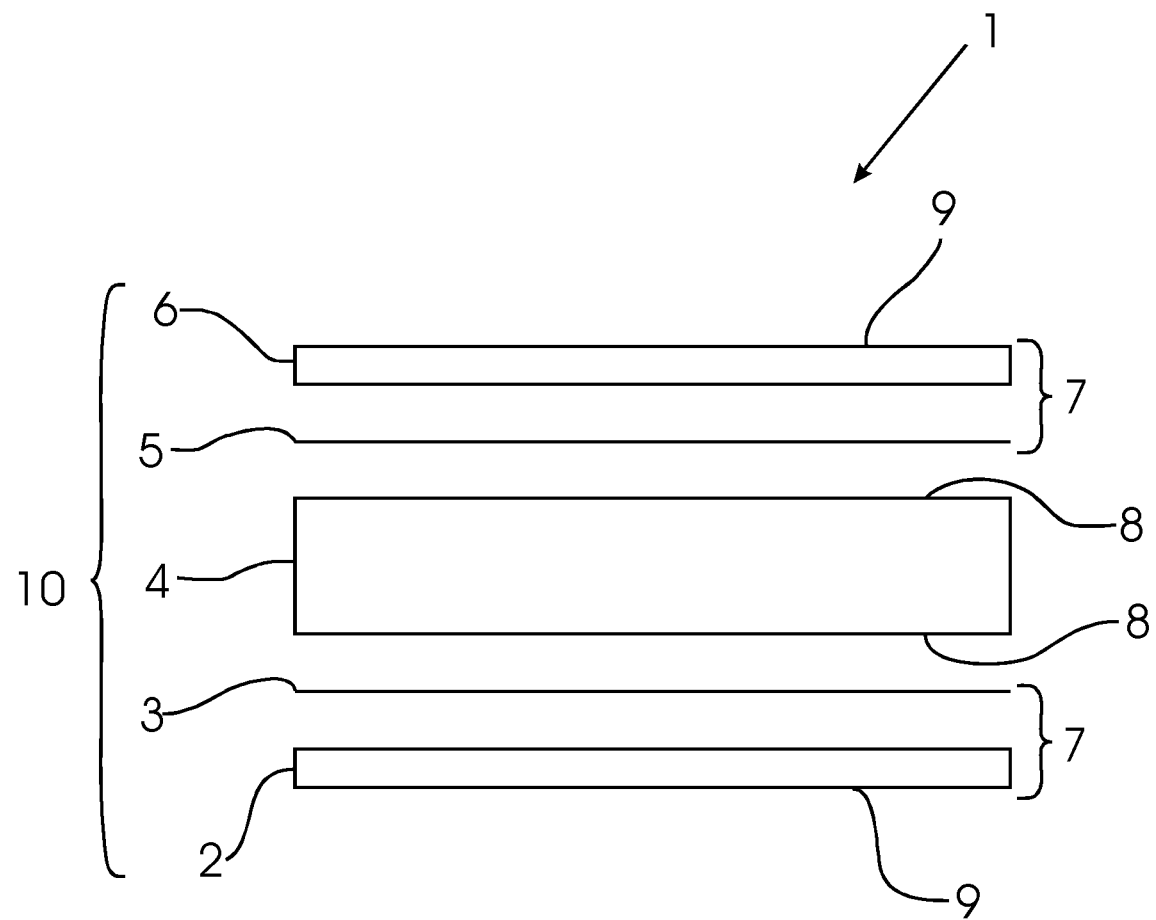

COMPOSITE BOARD COMPOSED OF WOOD MATERIAL WITH A MIDDLE LAYER MADE OF PLYWOOD

BACKGROUND OF THE INVENTION

The invention relates to a composite board composed of wood material, comprising a middle layer composed of plywood, which is to have strength properties which are as good as possible. At the same time, the surface of the composite board is to be suitable for the application of decorative coatings.

Composite boards composed of wood material, which are suitable for heavy loads and which can be provided with decorative surface coatings, are for example offered as PremiumBoard MFP Hybrid by Pfleiderer (Pfleiderer, PremiumBoard MFP Hybrid brochure, published October 2013). FINSA offers a similar board under the name superPan. Egger offers the Combiline board. All of these boards are composite boards composed of wood material, which have a middle layer composed of chipboard or OSB (OSB=Oriented Strand Board). Outer layers composed of fiberboard are glued onto the middle layer; in the case of Egger's Combiline board, very thin MDF boards (MDF=medium-density fiberboard) are used. In the case of Pfleiderer, the boards are glued on by means of polyvinyl acetate glue. These boards are offered for use as supporting boards in furniture making, shelves, but also for construction purposes, especially in interior construction.

These generic composite boards already have usable strength properties for the envisaged areas of application, by way of example a bending strength of approx. 28 N/mm$^2$, a transverse tensile strength of 0.5 N/mm$^2$ and a surface soundness of 0.8 N/mm$^2$ for a 16 mm-thick board having an average bulk density of 830 kg/m$^3$ (Pfleiderer, PremiumBoard MFP Hybrid brochure, published October 2013). The strength of this known composite board is limited by the forces which the glued joint between the middle layer and the outer layer can withstand. However, a greater bending strength of the middle layer is also desirable, in particular for constructional applications.

However, the production of the composite board described above is complex, because gluing the boards all-over is operationally complex and it is technically difficult to ensure an even distribution of the glue over the entire surface of the middle layer or respectively outer layer which is to be connected. An uneven distribution of the glue results in gluing which is of poor quality in some places. In addition, the glue used to connect the outer layer to the middle layer introduces considerable quantities of liquid, both into the middle layer and into the outer layer, such that deformation of the middle layer or respectively of the outer layer has to be prevented during the setting of the glue.

It is therefore the object of the invention to propose an economically producible, highly durable composite board composed of wood material, which has good strength properties.

SUMMARY OF THE INVENTION

The object is achieved with a composite board composed of wood material as well as a method for producing a composite board composed of wood material as disclosed herein.

It is an essential feature of the invention that an artificial resin-impregnated paper is utilized between the middle layer and at least one outer layer. In this case, the artificial resin-impregnated paper is therefore—differently than the usual situation—not arranged on the outer side of a composite board, but in the edge area immediately below the outer layer of a composite board according to the invention. The artificial resin-impregnated paper connects the middle layer and the at least one outer layer to one another. A middle layer which is connected on each of its two surfaces (upper side and lower side of the middle layer) to an outer layer by means of an artificial resin-impregnated paper is preferred. Here, the middle layer consists of a plywood board. Any plywood can be utilized, wherein plywood having a high bending strength is preferred, e.g. plywood made of birch or beech, but plywood made of poplar or tropical woods such as Lauan or Meranti is also suitable. Both plywood boards made of layers of uneven thickness or multiplex boards having layers of the same thickness are suitable. The outer layer is preferably produced from medium-density or high-density fiberboard (MDF or HDF). The outer layer is particularly preferably produced from a fiberboard having a density of 1,000 kg/m$^3$ or more. The maximum density which can currently be technically produced for fiberboards is 1,300 kg/m$^3$. According to an advantageous embodiment of the invention, the outer layer is stained, in particular stained dark. The thickness of the outer layer is preferably 1 mm to 9 mm, particularly preferably 1.5 mm to 6 mm.

The artificial resin-impregnated paper consists of a paper web, mostly having the dimensions of the middle layer or outer layer which is to be connected, wherein the paper web is impregnated with a liquid artificial resin and subsequently dried. The paper web itself preferably has a grammage of 15 g/m$^2$ to 100 g/m$^2$ as base paper without artificial resin. For economic reasons, the paper is preferably undyed and unprinted since the paper is no longer visible following the application of the outer layer. The artificial resin which is utilized for impregnating the board is preferably selected from the group which comprises: urea, melamine, phenolformaldehyde resin, or combinations of the aforementioned artificial resins, so-called mixed resins or derivatives, are utilized. High-tech resins such as e.g. epoxy resins are also possible for particular applications, but these are only very rarely utilized because of the costs.

The artificial resin is dried following the impregnation of the paper, but not cured. It is advantageously utilized in a quantity of 30 g/m$^2$ to 200 g/m$^2$, preferably in a quantity of 30 g/m$^2$ to 120 g/m$^2$, advantageously in a quantity of 50 g/m$^2$ to 100 g/m$^2$.

In order to realize the advantages of the composite board according to the invention, it is sufficient, according to a simple embodiment, if the paper is impregnated with artificial resin. An additive which can, however, be advantageously added to the paper or the artificial resin is a substance which makes difficult or prevents igniting or combusting of the composite board. Such substances are known per se: they are frequently monoammonium phosphate compounds. Since the artificial resin-impregnated paper is arranged close to the surface of the composite board, it can effectively prevent the combustion of the composite board. Additives which are usually added to known artificial resin-impregnated papers such as, for example, corundum are not required to produce a composite board composed of wood material having improved strength properties. They can be easily dispensed with for profitability reasons.

Substituting the use of glue applied as a liquid with an artificial resin-impregnated paper eliminates disadvantages and brings with it unexpected advantages: replacing a liquid with a non-liquid, artificial resin-impregnated paper avoids the unwanted introduction of liquid, in particular water, into the middle layer and the outer layers. The relatively low quantities of water which are released during the curing of some glues already result in an unwanted swelling of the middle or outer layer and, therefore, the introduction of stresses into the board, resulting in unwanted deformations. In addition, an uneven application of liquid glue is avoided, since the artificial resin-impregnated paper is available in consistently good quality even in large sizes. The artificial resin-impregnated paper can be provided in large paper webs which correspond to the format of the middle layer and the outer layers.

It can be considered advantageous that a pile of material to be pressed composed of at least one outer layer and a middle layer as well as an artificial resin-impregnated paper arranged between the outer layer and middle layer can be compressed in a usual short-cycle press to form a composite board. Short-cycle presses are standard operating equipment for the production of laminated products or composite boards. The utilization of elaborate gluing devices is dispensed with. A pile of material to be pressed is preferably compressed to form a composite board which—viewed from the underside of the pile of material to be pressed—consists of a lower outer layer, a lower artificial resin-impregnated paper, a middle layer, an upper artificial resin-impregnated paper and an upper outer layer.

The composite board composed of wood material according to the invention, comprising a middle layer composed of plywood, additionally has considerably improved strength properties compared to known composite boards composed of wood material. Compared to known composite boards composed of wood material, the composite board according to the invention has a transverse tensile strength, flexural strength and surface soundness which is, in each case, increased by approx. 50%. This extraordinary increase in strength can be attributed to the fact that in the edge area of the composite board, which is particularly stressed by forces acting on it and which extends from the outer side of the outer layer to the surface of the middle layer, the forces acting no longer have to be absorbed solely by the outer layer and a glued joint. Rather, it is shown that the artificial resin-impregnated paper makes a significant contribution to improving the strength of the composite board according to the invention, both due to the artificial resin which is anchored particularly well to the surfaces of the outer layer and the middle layer and which has a high inherent strength, but also due to the paper which can also be viewed as a strengthening reinforcement composed of fibers in the composite board according to the invention. The artificial resin-impregnated paper, which is arranged in the edge area of the composite board according to the invention, acts rather like a tension rod.

The process of coating chipboard with a real wood veneer using an artificial resin-impregnated paper is indeed known from DE 103 00 247 B4 (Kronotec AG). However, in this context, a colored paper was used in order to ensure that the surface of the board provided with the real wood veneer is visually appealing. The strength properties of the board described in DE 103 00 247 B4 are not checked. No information is provided regarding the effect of an artificial resin-impregnated paper on the development of strength of a composite board.

DE 103 00 247 B4 therefore does not relate to the subject matter of the present invention since, in this case, it concerns a composite board composed of wood material, in which not only does the middle layer have plywood, but also the outer layer consists of wood material, and wherein this composite board is optimized in order to achieve high strengths. The composite board according to the invention can be utilized as a building and construction board, e.g. in furniture making, in interior construction, in scenery construction and for similar uses. If it is necessary to use a composite board composed of wood material having a decorative surface, the outer side of the composite board according to the invention must be provided with a further coating.

Since the artificial resin-impregnated paper is a cheap product which is readily available in uniform quality and since existing production systems (a short-cycle press) can be deployed, the composite board according to the invention can be produced economically.

The connection between the middle layer and the at least one outer layer is preferably produced by arranging an artificial resin-impregnated paper between the at least one outer layer and the middle layer composed of plywood. In particular, it is advantageous to connect a pile of material to be pressed to form a composite board composed of wood material according to the invention, which is composed of a lower outer layer, a lower artificial resin-impregnated paper, a middle layer, an upper artificial resin-impregnated paper and an upper outer layer. The pile of material to be pressed is assembled and fixed e.g. with the usual tools (stacking devices, trays, clamps) and transported to the short-cycle press. There, the pile of material to be pressed is compressed between heated press plates. During the compression operation, the artificial resin liquefies and then cures.

This produces mechanical and, presumably, also chemical bonds to the surface of the outer layer and the middle layer, so that the outer layer and middle layer are firmly connected to one another. The paper is not damaged by the liquefying and curing of the artificial resin. It remains embedded in the cured layer of artificial resin and, in particular, withstands tensile stresses which act on the edge area of the composite board according to the invention.

The composite board composed of wood material according to the invention has exceptionally good strength properties. This can be attributed, on the one hand, to the particularly solid middle layer but also, in particular, to the fact that it is not only the artificial resin-impregnated paper which significantly contributes to the strength of the composite board in the edge area of the composite board. An outer layer composed of fiberboard material also significantly contributes to the high strength values which are measured for the composite board according to the invention. The outer layer of the composite board according to the invention is selected, from the viewpoint of maximum strength, from fiberboards. Fiberboards do not have a decorative surface. According to a preferred further embodiment of the invention, the outwardly-facing surfaces of the outer layer can therefore be provided with a further single-layer or multi-layer coating. The outwardly-facing surface of an outer layer can, by way of example, be coated by at least one layer of paint, varnish, HPL (high pressure laminate) or veneer, or by a combination of these layers, for example veneer and varnish.

Other materials which can be applied, either individually or in combination, to the outer layer of a composite board according to the invention are e.g. paper and cardboard, in particular wallpaper, film, textiles such as e.g. fabric or felt, vinyl, leather, cork, stone surfaces, metals or respectively metal films, plastic coatings of polypropylene, polyethylene or polyvinyl acetate, ceramic coatings such as tiles or mixtures of ceramic and artificial resin, glass, writable films (blackboard film), magnetic layers, radiation-inhibiting, e.g. lead-containing, films or boards, mineral fabrics, laid fabrics or nonwoven fabrics such as e.g. basalt fabric, which can withstand forces. Fibers or fiber blends can also be applied as a coating to the outer layer of a composite board according to the invention, e.g. organic fibers such as cellulose fibers, synthetic fibers such as plastic fibers, or inorganic fibers such as metal or ceramic fibers.

The aforementioned coating materials can, depending on the configuration, be utilized for aesthetic purposes, e.g. fabric or wallpaper. However, they can also be utilized for technical improvements such as e.g. coatings which magnetize the surface, which have a radiation-inhibiting effect or which further improve the strength properties.

A combination of the aforementioned materials is also possible, both in the way that the materials are applied above one another, e.g. a radiation-inhibiting film or board is first applied to the board, which is then covered with a decorative film made of plastic or metal. However, it is also possible to coat the outer layer of the composite board according to the invention in sections with different materials next to one another, by way of example affixing leather and cork next to one another in order to achieve a certain aesthetic effect.

The result of combining a high-strength composite board with the simple coating ability in order to further improve the technical and aesthetic properties of the board is that the composite board according to the invention can be particularly utilized for demanding uses, e.g. in the laboratory equipment sector or in the practice equipment sector.

BRIEF DESCRIPTION OF THE DRAWINGS

Details of the invention are explained in greater detail below on the basis of an exemplary embodiment, wherein:

FIG. 1 shows a schematic representation of the structure of a preferred embodiment of the composite board composed of wood material according to the invention.

DETAILED DESCRIPTION

FIG. 1 shows a schematic representation of the layers of a preferred embodiment of the composite board 1 composed of wood material according to the invention, comprising a lower outer layer 2, a lower artificial resin-impregnated paper 3, a middle layer 4, an upper artificial resin-impregnated paper 5 and an upper outer layer 6, using the example of a pile of material to be pressed 10. The lower and the upper outer layer consist, in the case of the exemplary embodiment shown in FIG. 1, of 6 mm-thick HDF board having a density of 1000 kg/m$^3$ to 1050 kg/m$^3$, e.g. a SWISSCDF untreated board. The outer layers are stained black.

Irrespective of the exemplary embodiment, it must however be stated that the material and thickness of the outer layers can be selected independently of each other. The lower and the upper outer layer can therefore have different thicknesses. They can also be selected from different materials.

In the case of the present exemplary embodiment, the middle layer 4 consists of a 19 mm-thick birch plywood board. A lower or respectively upper artificial resin-impregnated paper 3, 5 is, in each case, arranged between the lower and upper outer layers 2, 6 and the middle layer 4. The artificial resin-impregnated paper is produced from a base paper having a sheet weight of 27 g/m$^2$ prior to the impregnation with artificial resin. Following the impregnation with artificial resin, here: urea-melamine, the basis weight of the paper is 125 g/m$^2$. On compressing with the outer layers 2, 6, the paper has 7% moisture. This moisture content approximately corresponds to the residual moisture of the outer layers 2, 6 and the middle layer 4, such that no additional moisture is introduced into the wood material boards of the outer layers 2, 6 and the middle layer 4 during the compressing.

The pile of material to be pressed 10 shown in FIG. 1 is compressed in a short-cycle press, the press plates of which are heated up to 150° Celsius, for 300 seconds. During this time, the artificial resin melts and cures. At the end of the compression operation, a composite board composed of wood material having a board thickness totaling approx. 31 mm and an average bulk density in accordance with EN 323 of approx. 900 kg/m$^3$ was produced, for which the following strength values were measured:

Transverse tensile strength (measured in accordance with EN 319): 0.75 N/mm$^2$

Bending strength (measured in accordance with EN 310): 45 N/mm$^2$

Surface soundness (measured in accordance with EN 311): 1.26 N/mm$^2$

The strength values of the composite board composed of wood material according to the invention, which were largely improved by more than approx. 50%, can possibly be substantially attributed—in addition to the utilization of a particularly solid middle layer—to improvements in the edge area 7 of the composite board, which is composed of the artificial resin-impregnated paper and an outer layer; which therefore extends—to put it another way—from the surface 8 of the middle layer 4 up to the outer side 9 of an outer layer.

In the case of the composite board 1 according to the invention, the artificial resin used has, on the one hand, very good strength properties, because it is also very well anchored, mechanically, to the surface of the outer layer and the middle layer due to the compressing in the short-cycle press. On the other hand, the paper embedded in the artificial resin is also fully intact following the compressing of the pile of material to be pressed and the fiber strand of the paper web is an additional component of the composite board 1 according to the invention, which is suitable for withstanding tensile forces.

In the edge area 7 of the composite board according to the invention, when compressive or tensile forces act from externally, tensile forces occur in each case in the tensile-stressed edge area of the composite board 1. To date, the ability to withstand these tensile forces has been limited by the strength of the glued joint between the middle layer and an outer layer of known composite boards composed of wood material. In the case of the composite board 1 according to the invention, it is not only the artificial resin which is able to withstand high tensile forces. In particular, the fibers of the paper are also able to withstand high tensile forces. In this respect, the lower and the upper artificial resin-impregnated paper 3, 5 act in a similar way to a tensile rod which is mounted in the edge area 7 of the composite board 1.

Irrespective of the present exemplary embodiment, it should be noted that the artificial resin-impregnated paper has the advantage, compared to the previously known and usual application of glue to the outer layer and/or middle layer, that the artificial resin-impregnated paper is better able to compensate for unevennesses of the surfaces of the outer layer and middle layer, such that weak points in the connection of the outer layer and middle layer are largely excluded, and composite boards which have a good dimensional stability and planar outer sides are provided.

A first outer layer of a composite board is glued to square portions made of leather and copper film, in order to configure an aesthetic surface. For this purpose, the other materials indicated above in the description can also be utilized. A second outer layer of a composite board is glued to a radiation-inhibiting metal film made of lead, onto which an HPL laminate is then laminated. This produces a technically improved surface which is easy to care for.

The invention claimed is:

1. A composite board composed of wood material, comprising a middle layer (4) composed of plywood, wherein the middle layer (4) is connected to at least one outer layer (2, 6) composed of fiberboard, wherein the fiberboard has a density of at least 1,000 kg/m$^3$, wherein an artificial resin-impregnated paper (3, 5) is arranged between the middle layer (4) and the at least one outer layer (2, 6).

2. The composite board according to claim 1, wherein the artificial resin-impregnated paper (3, 5) has a sheet weight of 15 g/m$^2$ to 100 g/m$^2$.

3. The composite board according to claim 1, wherein the artificial resin-impregnated paper (3, 5) has artificial resin in a quantity of 30 g/m$^2$ to 200 g/m$^2$.

4. The composite board according to claim 1, wherein the artificial resin-impregnated paper (3, 5) is impregnated with one or more artificial resin selected from the group consisting of urea, melamine, formaldehyde, phenol resin, epoxy resin, and mixtures and derivatives thereof.

5. The composite board according to claim 1, wherein the artificial resin-impregnated paper (3, 5) comprises an additive which prevents igniting or combusting of the composite board.

6. The composite board according to claim 1, wherein the middle layer (4) is provided with an outer layer (2, 6) on both sides.

7. The composite board according to claim 1, wherein the at least one outer layer (2, 6) has a board made of fiberboard.

8. The composite board according to claim 1, wherein the at least one outer layer (2, 6) has a board thickness of 1 mm to 9 mm.

9. The composite board according to claim 1, wherein a further coating is applied to an outer side (9) of at least one of said at least one outer layer (2, 6) of the composite board.

10. The composite board according to claim 9, wherein a coating from the group which comprises individually or in combination: paint, varnish, HPL or veneer, paper, cardboard, wallpaper, film, textiles, fabric, felt, vinyl, leather, cork, stone surfaces, metals, metal films, plastic coatings, polypropylene, polyethylene or polyvinyl acetate coatings, ceramic coatings, tiles, mixtures of ceramic and artificial resin, glass, writable films, magnetic coatings, radiation-inhibiting films or boards, mineral fabric, organic, inorganic and synthetic fibers, is applied as the further coating to the outer side (9) of the at least one of said outer layer (2, 6).

11. A method for producing a composite board composed of wood material, comprising a middle layer (4) composed of plywood, wherein the middle layer (4) is connected to at least one outer layer (2, 6) composed of fiberboard, wherein the fiberboard has a density of at least 1,000 kg/m$^3$, wherein an artificial resin-impregnated paper (3, 5) is arranged between the middle layer (4) and the at least one outer layer (2, 6), the method comprising the steps of:
   assembling a pile of material to be pressed (10) having the middle layer (4), the artificial resin-impregnated paper (3, 5) and the at least one outer layer (2, 6), wherein the artificial resin-impregnated paper is inserted between the middle layer and the outer layer, and
   compressing the pile of material to be pressed (10) to form the composite board (1).

12. The method according to claim 11, wherein the pile of material to be pressed (10) is compressed under increased pressure and increased temperature.

13. The method according to claim 11, wherein the pile of material to be pressed (10) is compressed to form the composite board (1) by softening artificial resin with which the artificial resin-impregnated paper is impregnated, and subsequently solidifying the artificial resin.

14. The composite board of claim 8, wherein the board thickness is 1 mm to 6 mm.

15. The composite board of claim 1, wherein the density is up to 1,300 kg/m$^3$.

16. A composite board comprised of wood material, comprising a middle layer (4) composed of plywood, wherein the middle layer (4) is connected to at least one outer layer (2, 6) composed of fiberboard, said fiberboard being a high-density fiberboard with a density of at least 1,000 kg/m$^3$ and having a thickness of 6 mm to 9 mm, wherein an artificial resin-impregnated paper (3, 5) is arranged between the middle layer (4) and the at least one outer layer (2, 6).

17. The composite board according to claim 16, wherein the high-density fiberboard has a density of up to 1,300 km/g$^3$.

* * * * *